United States Patent [19]

Wong

[11] Patent Number: 5,047,501

[45] Date of Patent: Sep. 10, 1991

[54] PYRIDINE DERIVATIVES

[75] Inventor: Pui K. Wong, Amsterdam, Netherlands

[73] Assignee: Shell Oil Company, Houston, Tex.

[21] Appl. No.: 394,310

[22] Filed: Aug. 14, 1989

Related U.S. Application Data

[63] Continuation of Ser. No. 138,768, Dec. 29, 1987, abandoned.

[51] Int. Cl.$^5$ ..................... C08G 67/02; C07D 401/06
[52] U.S. Cl. .................................... 528/392; 546/256; 546/281
[58] Field of Search ................. 546/281, 256; 528/392

[56] References Cited

U.S. PATENT DOCUMENTS

| | | | |
|---|---|---|---|
| 2,495,286 | 1/1950 | Brubaker | 528/392 |
| 3,694,412 | 9/1972 | Nozaki | 528/392 |
| 3,979,374 | 9/1976 | Kiovsky et al. | 525/55 |

FOREIGN PATENT DOCUMENTS

| | | | |
|---|---|---|---|
| 0121965 | 10/1984 | European Pat. Off. | 528/392 |
| 0181014 | 5/1986 | European Pat. Off. | 528/392 |
| 0222454 | 5/1987 | European Pat. Off. | 528/392 |
| 1081304 | 3/1965 | United Kingdom | 528/392 |

Primary Examiner—Alan L. Rotman

[57] ABSTRACT

Polymeric polypyridines are produced by reaction of an aminopyridine or aminoalkylpyridine with a linear alternating copolymer of carbon monoxide and ethylene in an aprotic reaction diluent.

16 Claims, No Drawings

PYRIDINE DERIVATIVES

This is a continuation of application Ser. No. 138,768, filed Dec. 29, 1987, now abandoned.

FIELD OF THE INVENTION

This invention relates to certain polymeric polypyridines having a plurality of pyridine groups attached to a polymer chain. More particularly, it relates to a class of novel polypyridines produced by reaction of an aminopyridine or aminoalkylpyridine and a linear alternating polymer of carbon monoxide and ethylene.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical catalysts, e.g., peroxy compounds. Nozaki produced linear alternating copolymers of carbon monoxide and ethylene, inter alia, in the presence of arylphosphine complexes of palladium as catalyst employed with certain inert solvents. See, for example, U.S. Pat. No. 3,694,412.

More recently, the class of linear alternating polymers and at least one ethylenically unsaturated hydrocarbon (including ethylene) has become of greater interest because of the greater availability of the polymers. The more recent general process for the production of such polymers is illustrated by published European Patent Applications including 0,121,965 and 0,181,014 and by copending U.S. patent application Ser. No. 930,468, filed Nov. 14, 1986 (Docket No. K-0722). The process generally involves a catalyst composition formed from a compound of the Group VIII metals palladium, cobalt or nickel, the anion of a nonhydrohalogenic acid having a pKa less than about 6, preferably less than about 2, and a bidentate ligand of phosphorus, arsenic or antimony.

The class of linear alternating polymers and at least one ethylenically unsaturated hydrocarbon, also known as polyketones or polyketone polymers, is now conventional. The polyketone polymers are known to be premium thermoplastics having utility in a variety of applications. However, because of the presence within the polymer of carbonyl functional groups, it is possible to chemically modify the polymer by reaction at or through the carbonyl group to produce modified polymers of modified properties. For example, reduction of the carbonyl function leads to the production of polyols and reductive amination leads to the presence of amino groups attached to the polymer chain.

A polymeric pyrrole derivative of the copolymer of carbon monoxide and ethylene is shown by Kiovsky et al, U.S. Pat. No. 3,979,374 wherein the copolymer and a variety of aliphatic or arylaliphatic amines is reacted in hydroxylic solvent with the copolymer to produce polymers having groups of the structures

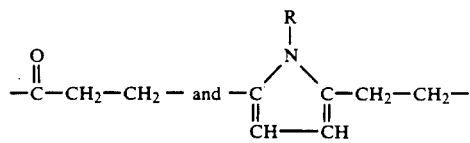

in ratios where the carbonyl moiety was present in considerable excess over the pyrrole moiety. In the process of Kiovsky, a low conversion to pyrrole derivatives was desired and indeed the conversion of carbonyl group was less than 50%, more often less than 25%. The stated objective of Kiovsky et al was merely to modify the polyketone properties and thereby achieve improved processability. However, it would be of advantage to more extensively modify the polyketone copolymer and thereby produce polymeric derivatives having utilities beyond those of the polyketone.

SUMMARY OF THE INVENTION

The invention relates to a class of novel polymers having pyridine substituents attached to a polymer chain incorporating pyrrole moieties. The invention also relates to an improved method of reacting copolymers of carbon monoxide and ethylene with an aminopyridine or aminoalkylpyridine to produce the novel polypyridines.

DESCRIPTION OF THE INVENTION

The polymeric precursor of the polypyridines of the invention is a linear alternating copolymer of carbon monoxide and ethylene represented by the repeating formula

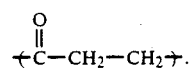

The end groups or "caps" of the polymer depend on what materials are present during the production of the polymer and whether and how the polymer has been purified. However, the precise nature of the end groups is of little significance so far as the overall properties of the polymer are concerned so that the polymer is fairly represented by the polymer chain as depicted above.

Of particular interest are the polymers of the above structure having a molecular weight of from about 1,000 to about 200,000 but more particularly having a molecular weight of from about 10,000 to about 50,000. The physical properties of these polymers will vary somewhat as does the molecular weight but the polymers are crystalline and are characterized by a melting point on the order of 260° C.

The polymers are produced by contacting the carbon monoxide and ethylene in the presence of a suitable catalyst composition. Although the scope of copolymer production is extensive, see, for example, the above published European Patent Applications, for purposes of illustration a preferred catalyst is formed from palladium acetate, the anion of trifluoroacetic acid or p-toluenesulfonic acid and a bidentate phosphorus ligand selected from 1,3-bis(diphenylphosphino)propane and 1,3-bis[di(2-methoxyphenyl)phosphino]propane. Reaction is preferably conducted under polymerization conditions of elevated temperature and pressure and in the liquid phase in the presence of an inert diluent such as methanol or ethanol. The copolymer is typically insoluble in the media of its production and is recovered as by filtration or decantation.

The pyridine precursor of the polypyridines of the invention is an aminopyridine or aminoalkylpyridine having up to 2 substituents on the pyridine ring which independently are hydrocarbyl groups of up to 10 carbon atoms. Such pyridines are illustrated by the formula

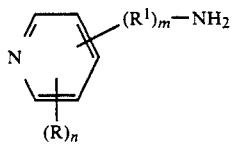

wherein $R^1$ is a hydrocarbyl bridging group of up to 10 carbon atoms, m is an integer from 0 to 1 inclusive, R independently is a hydrocarbyl group of up to 10 carbon atoms and n is an integer from 0 to 2 inclusive. Illustrative hydrocarbyl $R^1$ bridging groups include alkarylene and arylene groups such as phenylene but preferred $R^1$ bridging groups are alkylene and alkylidene groups such as methylene, ethylene, propylene, hexylene and decylene. Particularly preferred hydrocarbyl $R^1$ bridging groups are lower alkylene of up to 4 carbon atoms, and especially preferred is methylene. Illustrative R groups include aryl and alkaryl groups such as phenyl and tolyl but preferred R groups are alkyl such as methyl, ethyl, propyl, hexyl, octyl and decyl. Particularly preferred hydrocarbyl R substituents are lower alkyl of up to 4 carbon atoms, but best results are obtained when the aminopyridine or aminoalkylpyridine derivative is otherwise unsubstituted, i.e., the compound of the above formula wherein $n=0$.

Suitable aminopyridines for use in the invention include, for example, 2-aminopyridine, 3-aminopyridine, 4-aminopyridine, 2-amino-4-picoline, 2-amino-3-picoline, 2-amino-6-picoline and 2-amino-4,6-dimethylpyridine. The preferred aminopyridine is 4-aminopyridine. Suitable aminoalkylpyridines for use in the invention include, for example, 2-aminomethylpyridine, 3-aminomethylpyridine, 4-aminomethylpyridine and 2-(2-aminoethyl)pyridine. The preferred aminoalkylpyridine is 4-aminomethylpyridine.

The polyketone copolymer and the aminopyridine or aminoalkylpyridine are contacted in the presence of an aprotic liquid reaction diluent. The pyridine derivative is typically employed in molar excess. Although the molar character of a portion of a polymer is often difficult to determine, it would seem that one mole of the pyridine derivative would react with two moles of carbonyl group present in the copolymer. Thus, molar ratios of pyridine derivative to carbonyl group of from about 2:1 to about 20:1 are suitable with molar ratios of from about 3:1 to about 10:1 being preferred.

Suitable reaction diluents are those in which the pyridine derivative is soluble and which do not contain one or more hydroxyl groups. Illustrative of such aprotic reaction diluents are hydrocarbon diluents including aliphatic hydrocarbons such as hexane and isooctane, aromatic hydrocarbons including benzene, toluene, xylene, and ethylbenzene; chlorinated hydrocarbon solvents such as chloroform, carbon tetrachloride and chlorobenzene; and ethers including dimethylether, diethyl ether and diisopropyl ether. Hydrocarbon or chlorinated hydrocarbon diluents are generally preferred over oxygenated diluents. Mixtures of such diluents are useful and particularly good results are obtained by the use of a mixture of toluene and chlorobenzene.

Reaction of the polyketone copolymer and pyridine derivative is conducted under conditions of elevated temperature and sufficient pressure to maintain the reaction mixture substantially in a non-gaseous phase. Reaction is suitably conducted in a pressure vessel or autoclave at elevated temperature and pressure but is most easily conducted under reflux at the boiling temperature of the reaction mixture. The polypyridine is typically obtained as an insoluble polymer which is separated from any unreacted copolymer by extraction with a solvent in which the polypyridine is soluble but the copolymer is not. In the modifications where the polypyridine is soluble in the reaction diluent, recovery is effected by diluent removal as by evaporation followed by a selective extraction of the desired polypyridine.

The polypyridine product of the invention is illustratively formed by condensation of the amino moiety of the pyridine derivative with two adjacent carbonyl groups of the copolymer to produce a pyrrole ring and in effect attach the pyridine to the ring through the pyrrole ring nitrogen. Statistically, there will be carbonyl moieties of the copolymer reactant which are unable to condense because of the removal of adjacent carbonyl groups through earlier reaction. Thus, the polypyridine will retain a certain proportion of the carbonyl-containing moieties of the

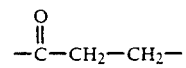

structure remaining from the polyketone copolymer reactant in addition to the pyridine-substituted pyrrole groups of the formula

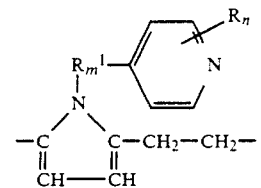

formed by condensation of the aminopyridine or aminopyridine and the carbonyl moieties of the copolymer. In contrast with earlier polymers of this type, however, the process of the invention results in the conversion of a high percentage of the carbonyl groups of the copolymer to produce polypyridine polymers having a preponderance of moieties of the pyridinesubstituted pyrrole type over the carbonyl-containing moieties, frequently at least a 5:1 preponderance. Conversion of carbonyl groups is typically over 85%, frequently over 90% and the polymer polypyridine products are represented by the formula

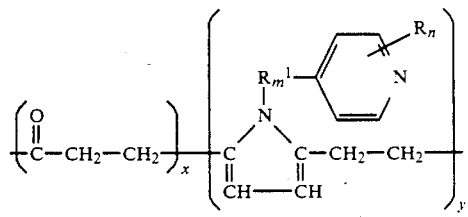

wherein $R^1$, R and n have the previously stated significance and the ratio of y:x is at least 5 and preferably at least 7.

The polypyridines of the invention are structurally related to the class of poly(vinyl pyridines) which are commercial materials with known utilities and share those utilities. Particular applications for the polypyridines result from conventional processing of the polypyridines into thin sheets or membranes which are useful in water treatment or gas separations due to the property of the membranes of allowing selective passage of materials through the pores of the membrane. The polypyridines may also be further modified, for example by alkylation of the nitrogen of the pyridine ring to prepare cation exchange resins useful in the purification of water.

The invention is further illustrated by the following Illustrative Embodiments which should not be construed as limiting the invention.

ILLUSTRATIVE EMBODIMENT I

A copolymer of carbon monoxide and ethylene was produced by a process substantially like that of published European Patent Application 0,181,014 in the presence of a catalyst composition formed from palladium acetate, the anion of trifluoroacetic acid and 1,3-bis(diphenylphosphino)propane. The copolymer had a melting point of 257° C. and a Limiting Viscosity Number (LVN) of 1.1, measured in m-cresol at 100° C.

ILLUSTRATIVE EMBODIMENT II

The copolymer of Illustrative Embodiment I (5 g) was treated with a molar excess (23.3 g) of 4-aminomethylpyridine in a 50/50 mixture (by volume) of toluene and chlorobenzene. The mixture was refluxed for 5 hours and then stirred overnight to produce a red brown polymer. The red brown polymer, recovered by filtration, was hard but readily soluble in chloroform. NMR analysis of the polymer indicated that approximately 93% of the carbonyl groups had reacted to produce a polypyridine of the following random structure.

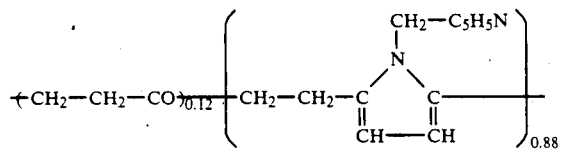

The presence of residual carbonyl is considered to be the statistical consequence of random condensation of the amine with a 1,4-diketone structure.

ILLUSTRATIVE EMBODIMENT III

When the procedure of Illustrative Embodiment II is repeated except that the reaction diluent is xylene, a good yield of the polymer polypyridine will be obtained.

What is claimed is:

1. A process for preparing a polymeric polypyridine product by contacting a linear alternating copolymer of carbon monoxide and ethylene and a molar excess of a pyridine reactant selected from an aminopyridine or aminoalkypyridine having up to 2 hydrocarbyl substituents on the pyridine ring, each of which hydrocarbyl substituents is an alkyl group of up to 10 carbon atoms, in a reaction diluent in which said pyridine reactant is soluble and which diluent does not contain a hydroxyl group, and at elevated temperature and pressure.

2. The process of claim 1 wherein the polymeric polypyridine product is of the formula

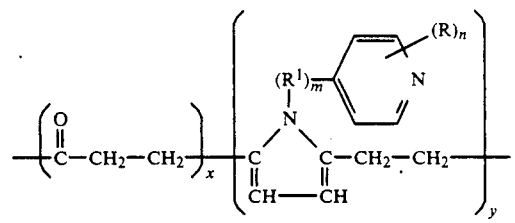

wherein $R^1$ is a lower alkylene bridging group of up to 4 carbon atoms, m is zero or 1, R independently is an alkyl group of up to 10 carbon atoms, n is zero, 1 or 2, x is an integer of 1 or greater, y is an integer of 5 or greater and the ratio of y:x is at least 5.

3. The process of claim 1 wherein the molar ratio of pyridine reactant to carbonyl group present in said linear alternating copolymer is about 2:1 to about 20:1.

4. The process of claim 1 wherein said linear alternating copolymer and said pyridine reactant are contacted in the presence of said reaction diluent under conditions of elevated temperature and sufficient pressure to maintain the resulting reaction mixture substantially in a non-gaseous phase.

5. The process of claim 2 wherein n is 0, m is 0 and the pyridine reactant is 4-aminomethylpyridine.

6. The process of claim 2 wherein m is 1 and $R^1$ is $-CH_2-$.

7. The process of claim 6 wherein the reaction diluent is a mixture of toluene and chlorobenzene.

8. The process of claim 6 wherein the reaction diluent is xylene.

9. The process of claim 7 wherein the ratio of y:x is at least 7.

10. A polymeric polypyridine product consisting essentially of x number of carbonyl-containing groups and y number of pyridine-substituted pyrrole groups, said product having the following formula

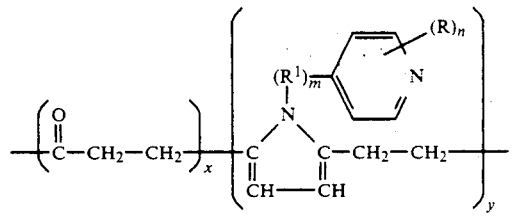

wherein $R^1$ is a lower alkylene bridging group of up to 4 carbon atoms, m is zero or 1, R independently is an alkyl group of up to 10 carbon atoms, n is zero, 1 or 2, x is an integer of 1 or greater, y is an integer of 5 or greater and the ratio of y:x is at least 5.

11. The polymeric polypyridene product of claim 10 wherein n is zero.

12. The polymeric polypyridine product of claim 11 wherein the ratio of y:x is at least 7.

13. A polymeric polypyridine product consisting essentially of carbonyl-containing groups of the structure

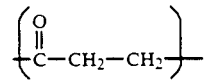

and pyridine-substituted pyrrole groups of the structure

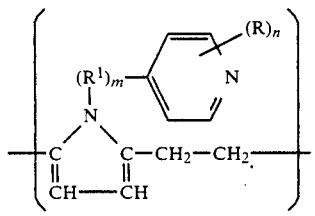

wherein $R^1$ is a lower alkylene bridging group of up to 4 carbon atoms, m is zero or 1, R independently is an alkyl group of up to 10 carbon atoms, n is zero, 1 or 2 and wherein over 85% of said polymeric polypyridine product is comprised of said pyridine-substituted pyrrole groups.

14. The product of claim 13 wherein n is zero.
15. The product of claim 14 wherein m is zero.
16. The product of claim 13 wherein m is 1 and $R^1$ is —$CH_2$—.

* * * * *